May 21, 1968      J. BROTHERS      3,384,140
HOSE REEL
Filed Aug. 29, 1966
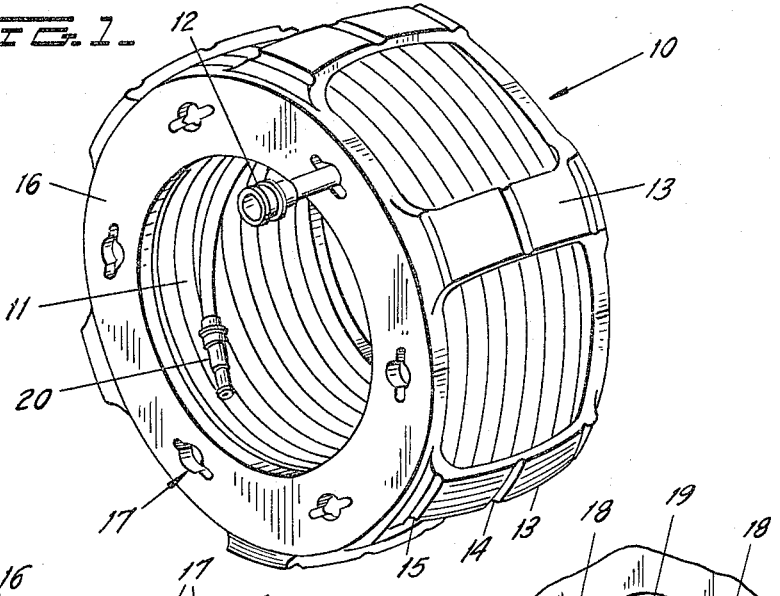
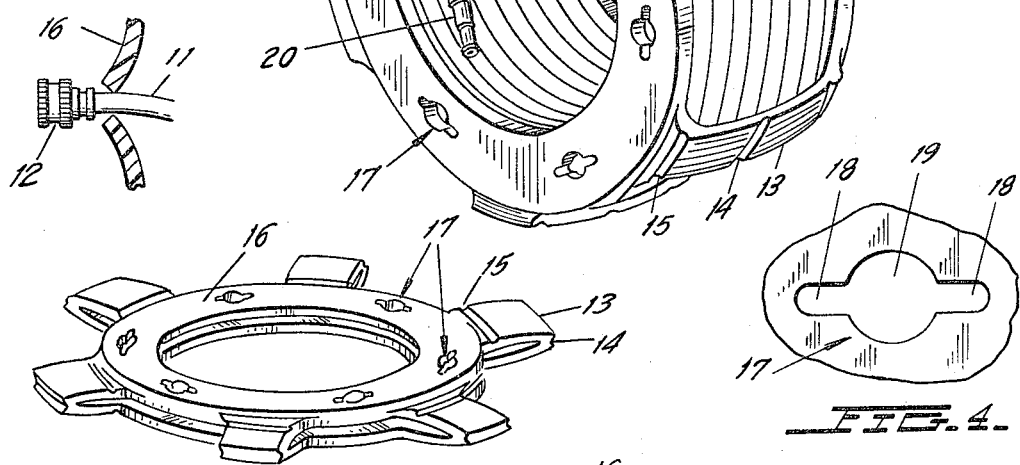
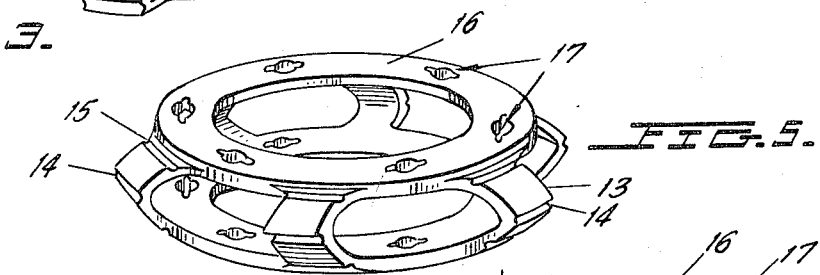
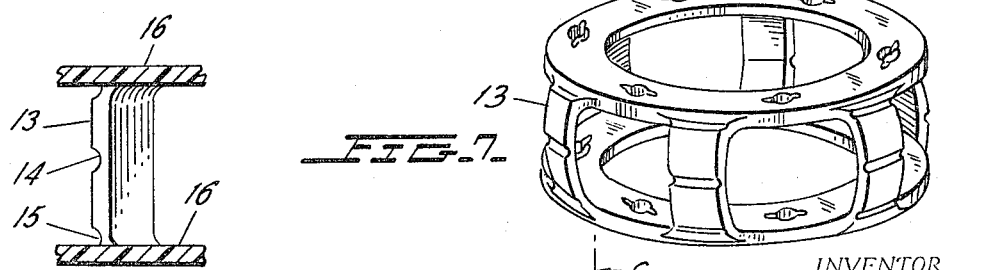
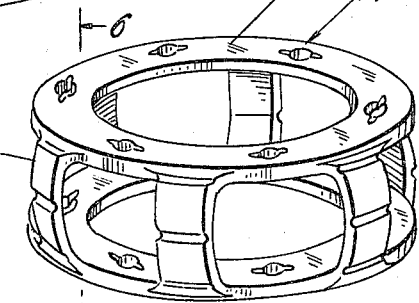
INVENTOR.
JACK BROTHERS
BY
OSTROLENK, FABER, GERB & SOFFEN
ATTORNEYS 3,384,140
HOSE REEL
Jack Brothers, 34 St. Mary Drive,
Succasunna, N.J. 07876
Filed Aug. 29, 1966, Ser. No. 575,845
7 Claims. (Cl. 150—52)

ABSTRACT OF THE DISCLOSURE

A collapsible device for storing flexible lines, such as hoses and the like, in the interior thereof in such a manner as to permit both ends of the flexible lines to be available for use whether the flexible line is partially or totally coiled within the storage device. The design of the device permits it to be stored in a collapsed condition when not used as a holder for the flexible line.

The present invention relates to a holder for flexible lines such as hoses and constitutes a means to both house and to maintain the flexible line in position for instant use.

There is at present a need for an inexpensive, simple means to coil and to store hoses quickly and effectively to prevent their uncoiling and thus getting tangled or under foot, creating a dangerous or unmanageable situation. There now exist holders for flexible lines with the following deficiencies: The lines, such as water hoses, all coil on the outside of the holder; the female end is applied to the holder first and is then covered by the remainder of the hose and is unavailable for connection to a faucet without unwinding all of the hose; the trailing end of the hose is unfastened and untidy because it is never known where it will come to rest on the holder; the holder can't collapse for storage; and tools are required to assemble and erect standard holders.

The present invention overcomes all of these deficiencies of the prior art. This pliable device can be collapsed; it coils on the inside for protection and retension of the hose line; and the female end can be used without completely unwinding the hose.

It is therefore an object of this invention to provide a simple means of effectively coiling for storage hoses such as garden hoses commonly used around most homes; fire hoses used at fire houses and at the site of a fire; as well as other hoses used in commercial and industrial establishments.

It is another object of the invention to provide housing for a flexible line that permits the line to be inserted around the interior, inner periphery thereof.

It is a further object of this invention to utilize the natural tendency of a coiled hose, or wire, or the like, to uncoil by providing the means for retaining the hose in a coiled, neat condition in a hose reel which can be selectably erected or collapsed.

It is still another object of this invention to provide a versatile hose reel which is sufficiently circular when it is erected that while retaining the hose it can be rolled from one point to another.

It is still another object of this invention to provide a hole or opening in the hose reel into which the female end of the hose can be inserted, and where it will be held by the gripping section of the hole, while the rest of the hose is being coiled.

It is still another object of this invention to provide the means whereby the female end of the hose, held securely in the hose reel, can be connected to a source of liquid, such as a water faucet, while all or some of the hose is coiled in the reel.

It is still another object of this invention to provide a means which will make possible the manufacture of a one piece erectable, collapsible hose reel which can be manufactured collapsed, can be packed, shipped, and sold collapsed or erected, and which when erected permits insertion and coiling of a hose. It is a feature of the invention that no tools are required at any time.

It is another object of this invention to provide a means for coiling a hose which will permit storage on a hook, nail, or similar device commonly used for hanging up items in garages, tool sheds, service buildings, and the like.

Other and more specific objects of this invention will become apparent as the description proceeds when taken in connection with the accompanying drawings illustrating preferred embodiments in which:

FIG. 1 is a perspective view of the invention.

FIG. 2 is a sectional view showing the hose, held by the hose reel.

FIG. 3 is a view showing the reel as manufactured in a collapsed condition, and with the hose removed.

FIG. 4 is an enlarged fragmentary view of the hose gripping opening.

FIG. 5 shows the reel of FIG. 3 in partially erected position.

FIG. 6 is a section of the crossband, and is taken on line 6—6 of FIG. 7.

FIG. 7 illustrates the hose reel in open position, and ready to receive the water hose.

Referring to the figures, and as seen in FIG. 1, the hose reel 10 of the invention is illustrated in use with the hose 11 coiled inside; the female end 12 of hose 11 being held in position and available for connection to a faucet (not shown). The crossband 13 is spaced about the retaining hose 11 in the reel and comprises a hinge-like construction by virtue of the reduced portions 14 and 15, as is shown in enlarged detail in FIG. 6. In this manner, the use of a unitary piece of flexible material is possible, with the action of a hinge obtained. The advantage over conventional hinge construction resides in the fact that the rusting of such metal elements cannot occur. As a hose reel is ordinarily surrounded by wet conditions, the usual metal hinge would corrode and thus shorten the life of the device. Any flexible, yet strong material, such as polyethylene is utilized. The reel 10 can be flattened for storage or shipping, as is shown in FIG. 3. This function of flattening the reel for storage is aided by the presence of hinge joint 14. The hinge joint 15 is a desirable feature as it aids in flexing the reel 10 when it is being opened or collapsed. It should be noted that the material used is resilient and thus can be utilized in the manner desired without becoming fatigued.

Referring to FIG. 1, the hose reel 10 consists of two spaced-apart and parallel washer-like members 16, retained in their fixed relation by the crossband members 13. Spaced about the washer-like members 16 are the hose-gripping openings 17 (see FIGS. 2 and 4). These openings are of such diameter that they are approximately equal to the outer diameter of a conventional hose 11. The transverse openings 18 which merge into the central opening 19 of the hose-gripping means 17 permit the enlarged connector end 12 of the hose reel to be forced therethrough and to extend outwardly in position for attachment to a faucet or other source of fluid supply. As is evident from FIG. 2, the walls of the washers 16 engage and hold the hose 11 in position at all times. The nozzle 20 of the hose 11 is free to be uncoiled as desired, when the hose is to be used.

In order to coil the hose 11, the female end 12 is inserted into and is passed through the gripping hole 17 by forcing the resilient material of washer-like member 16 aside. After female hose end 12 has passed through gripping hole 17, the resilient material of washer-like member 16 snaps back and grips hose 11 firmly. The rest of hose 11 can then be coiled inside hose reel 10 the nozzle 20 being inserted last. Nozzle 20 is the first portion of the hose to be withdrawn when in use. The hinge construction obtained by reducing the thickness of the wall 13 of the reel 10 thus avoids the need for a separate, hinge construction.

The hose 11 is inserted into the interior surface of the reel 10. This provides a unique and advantageous feature over conventional reels which receive the hose on the outer surface. In the instant construction, the hose is always protected against damage when in use. Also, the hose naturally coils itself when inserted in this manner. This further permits only the portion of the hose to be exposed that is in use at the time, the unused portion of the hose being retained in the housing 10. This avoids needless uncoiling and coiling of the hose, as exists with the externally wound type.

It is to be understood that the invention illustrates and describes but is not limited to a one-piece flexible plastic or rubber-like structure, since it can be made of several other materials, either flexible or rigid and of different modified structure without departing from the essence of the invention. Such variations within the scope of the invention comprise multiple pieces of wire appropriately bent, shaped and connected to form the washer-like members including the gripping hole; or pieces of wire appropriately bent, shaped and connected to the washer-like members to provide the crossbands with hinge-like connections including the gripping hole. Further, it can be made of multiple pieces of flat sheet metal appropriately shaped, bent and connected to provide washer-like members and connecting cross-bands also including the gripping holes.

Also, the invention concept is employed when it is made of canvas-like cotton material or the like in the same manner to provide the washer-like members and crossbands, and can be sewn together to provide flexibility without necessarily including hinge-like- members. Also the invention can be constructed of wood or wood laminates with appropriate hinge provided by flexible materials suitably fastened to the component parts such as the washer-like members and crossbands.

While there has been described what is at present considered to be the preferred embodiment of the invention, it is to be understood that various changes and modifications can be made therein without departing from the essence of the invention and it is intended to cover herein all such changes and modifications as come within the true spirit and scope of the appended claims.

I claim:
1. A storage device for flexible lines comprising
   a pair of spaced apart washer-like members in substantially parallel relation,
   a plurality of cross bands secured peripherally to said washer members, said cross band members lying in a plane substantially perpendicular to the plane of the washer-like members, thereby retaining said washer-like members in substantially spaced apart relation and providing a housing structure thereby,
   and openings in said washer-like members whereby a flexible line member may be retained therein and housed in said storage device for instant use.
2. The combination of claim 1, wherein said crossband is in the form of a hinge, whereby the storage device may be collapsed when not in use.
3. The combination of claim 2, wherein said hinge comprises a unitary piece of flexible material, and
   reduced portions on the hinge member providing score lines whereby the unitary flexible material may be bent to enable the storage device to be flattened for shipping or storing.
4. The combination of claim 3, wherein the flexible material is a polyethylene.
5. The combination of claim 1, wherein said washer openings comprise,
   an enlarged central portion and transverse smaller openings,
   said enlarged central portion being slightly smaller than the flexible member to be retained therein, the transverse openings enabling the central portion to be distended sufficiently to pass the flexible storage member therethrough, and upon release, to grip it securely in position for use.
6. The combination of claim 5, wherein said crossband is in the form of a hinge, whereby the device can be collapsed when not in use, and extended when the flexible member is stored therein.
7. The combination of claim 6, wherein said hinge comprises a unitary piece of flexible material, and
   reduced portions on said hinge member to enable it to be bent.

References Cited

UNITED STATES PATENTS

| | | | |
|---|---|---|---|
| 2,306,078 | 12/1942 | Nydegger | 206—45.31 |
| 2,579,131 | 12/1951 | Tinsley | 206—59 |
| 2,871,057 | 1/1959 | Bernyk | 248—89 |
| 2,878,848 | 3/1959 | Coltman | 150—.5 |

WILLIAM T. DIXSON, JR., *Primary Examiner.*